US007652873B2

(12) United States Patent
Lee

(10) Patent No.: US 7,652,873 B2
(45) Date of Patent: Jan. 26, 2010

(54) PORTABLE COMPUTER

(75) Inventor: Seung-woon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 752 days.

(21) Appl. No.: 11/203,300

(22) Filed: Aug. 15, 2005

(65) Prior Publication Data

US 2006/0038795 A1   Feb. 23, 2006

(30) Foreign Application Priority Data

Aug. 17, 2004   (KR)   ...... 10-2004-0064850

(51) Int. Cl.
*G06F 1/16* (2006.01)
(52) U.S. Cl. ............. 361/679.06; 361/679.08; 361/679.27; 361/679.55; 248/917; 248/920
(58) Field of Classification Search ........ 361/679–683; 312/223.1, 223.2; 248/917–924
See application file for complete search history.

(56) References Cited

U.S. PATENT DOCUMENTS

| | | | | |
|---|---|---|---|---|
| 5,205,017 | A  * | 4/1993 | Wang | 16/367 |
| 5,278,779 | A  * | 1/1994 | Conway et al. | 361/679.16 |
| 5,333,116 | A  * | 7/1994 | Hawkins et al. | 361/681 |
| 6,005,767 | A | 12/1999 | Ku et al. | |
| 6,317,315 | B1 * | 11/2001 | Lee et al. | 361/681 |
| 6,788,527 | B2 * | 9/2004 | Doczy et al. | 361/680 |
| 6,829,140 | B2 * | 12/2004 | Shimano et al. | 361/683 |
| 6,845,005 | B2 * | 1/2005 | Shimano et al. | 361/683 |
| 6,873,521 | B2 * | 3/2005 | Landry et al. | 361/681 |
| 6,903,927 | B2 * | 6/2005 | Anlauff | 361/681 |

(Continued)

FOREIGN PATENT DOCUMENTS

EP   454120 A2   10/1991

(Continued)

OTHER PUBLICATIONS

Office Action issued on Feb. 27, 2006 by the Korean Intellectual Patent Office (2 pages).

(Continued)

*Primary Examiner*—Jayprakash N Gandhi
*Assistant Examiner*—Anthony Q Edwards
(74) *Attorney, Agent, or Firm*—Staas & Halsey LLP

(57) ABSTRACT

The present invention relates to a portable computer including a tablet body to accommodate a plurality of hardware components and capable of a tablet operation, an input unit body to input data to the tablet body; and one link including a first end rotatably coupled to a rear of the tablet body and a second end rotatably coupled to a back of the input unit body, the tablet body alternating between a tablet operation position in which the tablet body is folded on the input unit body while the link is interposed between the rear of the tablet body and an upper surface of the input unit body, and an exposed position in which the tablet body coupled with the link is spaced from the input unit body and the input unit body is externally exposed. Thus, the present invention provides a portable computer which enables a user to rotate a tablet body and which has an attractive and slim outer appearance.

22 Claims, 12 Drawing Sheets

U.S. PATENT DOCUMENTS

| | | | |
|---|---|---|---|
| 6,952,340 B2* | 10/2005 | Son et al. | 361/680 |
| 6,975,507 B2* | 12/2005 | Wang et al. | 361/683 |
| 6,995,813 B2* | 2/2006 | Shin | 349/58 |
| 7,002,794 B2* | 2/2006 | Wang et al. | 361/683 |
| 7,052,296 B2* | 5/2006 | Yang et al. | 439/165 |
| 7,130,186 B2* | 10/2006 | Yu | 361/679.27 |
| 7,206,196 B2* | 4/2007 | Ghosh et al. | 361/683 |
| 7,215,538 B1* | 5/2007 | Chen et al. | 361/679.06 |
| 7,242,385 B2* | 7/2007 | Kojo | 345/156 |
| 7,277,086 B2* | 10/2007 | Sugihara | 345/169 |
| 7,308,733 B2* | 12/2007 | An et al. | 16/367 |
| 2002/0024499 A1* | 2/2002 | Karidis et al. | 345/156 |
| 2003/0222149 A1 | 12/2003 | Solomon et al. | |
| 2003/0223185 A1* | 12/2003 | Doczy et al. | 361/680 |
| 2004/0085720 A1 | 5/2004 | Arbogast et al. | |
| 2004/0114315 A1 | 6/2004 | Anlauff | |
| 2004/0141284 A1* | 7/2004 | Chen et al. | 361/681 |
| 2004/0227045 A1* | 11/2004 | An et al. | 248/278.1 |
| 2005/0007739 A1* | 1/2005 | Hata et al. | 361/699 |
| 2005/0057516 A1* | 3/2005 | Ghosh et al. | 345/168 |
| 2005/0057893 A1* | 3/2005 | Homer et al. | 361/683 |
| 2005/0104847 A1* | 5/2005 | Tanaka et al. | 345/156 |
| 2005/0105263 A1* | 5/2005 | Tanaka et al. | 361/683 |
| 2005/0135049 A1* | 6/2005 | Huang et al. | 361/683 |
| 2005/0135050 A1* | 6/2005 | Wang et al. | 361/683 |
| 2005/0139740 A1* | 6/2005 | Chen et al. | 248/286.1 |
| 2005/0237701 A1* | 10/2005 | Yu | 361/681 |
| 2008/0232054 A1* | 9/2008 | Chen et al. | 361/681 |

FOREIGN PATENT DOCUMENTS

| | | |
|---|---|---|
| EP | 454120 A3 | 10/1991 |
| EP | 0626632 A1 | 11/1994 |
| EP | 1418487 A2 | 5/2001 |
| JP | 3003560 | 8/1994 |
| JP | 2001-050244 | 2/2001 |
| KR | 2004-0037941 | 5/2004 |
| KR | 2004-0041762 | 5/2004 |
| WO | WO03/060349 A1 | 7/2003 |

OTHER PUBLICATIONS

European Search Report for corresponding European Patent Application No.05107574.5 dated Jun. 9, 2009, 5 pgs (in English).

European Search Report for corresponding European Patent Application No.: 05107574.5 dated Oct. 19, 2009, 11 pgs (in English).

* cited by examiner

FIG. 7

PORTABLE COMPUTER

CROSS-REFERENCE TO RELATED APPLICATION

This application claims the benefit of Korean Patent Application No. 2004-0064850, filed on Aug. 17, 2004, in the Korean Intellectual Property Office, the disclosure of which is incorporated herein by reference.

BACKGROUND OF THE INVENTION

1. Field of the Invention

The present invention relates generally to a portable computer. More particularly, embodiments of the present invention relate to a portable computer capable of a tablet operation.

2. Description of the Related Art

Generally, a portable computer requires good mobility, convenient operation while being carried, etc. Here, the term portable computer means any computer such as a laptop computer, a notebook computer, a palmtop computer, etc., which is handy to carry.

For example, a portable computer disclosed in U.S. Pat. No. 6,005,767 comprises a computer main body having a plurality of hardware components, and a display body receiving a video signal and displaying a picture based on the video signal. Further, the display body is folded on and opened from the computer main body through a first hinge and a second hinge. Also, the computer main body internally comprises a main board having a central processing unit, a graphic chip, etc., and externally comprises an input unit such as a keyboard, a mouse, etc.

With this configuration, the conventional portable computer display body can be adjusted to be opened from the computer main body at an angle of not only 90° but also 180° with respect to 0°, where 0° means that the display body is completely folded on the computer main body.

In a case where the display body has a touch-screen function and allows a user to perform a tablet operation, the display body has to be repeatedly rotated between 0° and 180°. Accordingly, there is a need for a display body that can be smoothly and minutely rotated in order to provide convenient operation.

Further, users tend to want an attractive and slim design. Accordingly, it is preferable that a portable computer have an attractive and slim outer appearance so as to satisfy end user's demand.

SUMMARY OF THE INVENTION

Accordingly, an aspect of the present invention provides a portable computer in which it is convenient for a user to rotate a tablet body, and which has an attractive and slim outer appearance.

The foregoing and/or other aspects of the present invention are achieved by providing a portable computer including a tablet body to accommodate a plurality of hardware components and that is capable of a tablet operation; an input unit body to input data into the tablet body; and one link having a first end rotatably coupled to a rear of the tablet body and a second end rotatably coupled to a back of the input unit body, wherein the tablet body alternates between a tablet operation position in which the tablet body is folded on the input unit body while the link is interposed between the rear of the tablet body and an upper surface of the input unit body, and an exposed position in which the tablet body coupled with the link is spaced from the input unit body and the upper surface of the input unit body is externally exposed.

According to another aspect of the present invention, the tablet body may be detachably coupled to the input unit body.

According to another aspect of the present invention, the portable computer may further comprise a coupling unit provided in a coupling portion between the link and the tablet main body and detachably coupling the tablet body to the input unit body, wherein the coupling unit comprises a projection provided in one of the tablet body and the link, and a rotation plate rotatably provided in the other and formed with a rotation projection to be locked to the projection.

According to another aspect of the present invention, the portable computer may further comprise a latch provided to slide in the input unit body, interlocking with the rotation plate, and rotating the rotation plate to cause the rotation projection to be locked to and released from the projection.

According to another aspect of the present invention, the rotation plate may be formed with a rotation guide projection, the link is formed with a projection guide elongated hole in which the rotation guide projection is inserted, and the latch is formed with a rotation guide elongated hole in which the rotation guide projection inserted in the projection guide elongated hole in the tablet operation position is guided.

According to another aspect of the present invention, the portable computer may further comprise a lever rotatably provided in the input unit body, connected to the latch, and allowing the latch to slide in the input unit body.

According to another aspect of the present invention, the latch may be formed with a lever projection, and the lever comprises a grip exposed to the outside of the input unit body, and a lever guide extending from the grip and stopped by the lever projection in the input unit body.

According to another aspect of the present invention, the portable computer may further comprise a guide provided in the input unit body and guiding the latch to slide; and a stopper assembly connecting the guide with the latch.

According to another aspect of the present invention, the portable computer may further comprise a first spring including a first end coupled to the input unit body and a second end coupled to the latch, and exerting an elastic force to the latch.

According to another aspect of the present invention, the portable computer may further comprise a locking unit provided between the link and the input unit body and allowing the link to be locked to and released from the input unit body.

According to another aspect of the present invention, the locking unit may comprise a locking hole provided in one of the link and the input unit body, and a locker provided to slide in the other and including a hook to be locked to the locking hole.

According to another aspect of the present invention, the portable computer may further comprise a knob provided to slide in the input unit body, connected to the locker, and making the locker to slide.

According to another aspect of the present invention, the portable computer may further comprise a first hinge rotatably connecting the link and the input unit body; and a second hinge rotatably connecting the link and the tablet body at a position spaced from the first hinge.

According to another aspect of the present invention, the portable computer may further comprise a supporting unit rotatably coupled to the link by the second hinge, wherein the supporting unit is formed with the locking hole to which the hook is locked in the tablet operation position.

According to another aspect of the present invention, the first hinge may comprise a pair of first hinge shafts; a first link shaft supporter provided in the link and supporting a first side of each first hinge shaft; and a first main shaft supporter provided in the input unit body and supporting a second side of each first hinge shaft, each first hinge shaft comprising a first main hinge shaft and a first link hinge shaft, which are rotatably coupled to each other.

According to another aspect of the present invention, the second hinge may comprise a pair of second hinge shafts; a second link shaft supporter provided in the link and supporting a first side of each second hinge shaft; and a second main shaft supporter provided in the supporting unit and supporting a second side of each second hinge shaft, each second hinge shaft comprising a second main hinge shaft and a second link hinge shaft, which are rotatably coupled to each other.

According to another aspect of the present invention, the input unit body may comprise a link accommodating portion to accommodate the link at the tablet operation position.

According to another aspect of the present invention, the link may comprise a connector assembly electrically connecting the tablet body with the input unit body.

According to another aspect of the present invention, the portable computer may further comprise a second spring including a first end coupled to the input unit body and a second end coupled to the locker, and exerting an elastic force to the locker.

According to another aspect of the present invention, the portable computer may further comprise a locking unit provided between the link and the input unit body and allowing the link to be locked to and released from the input unit body.

According to another aspect of the present invention, the locking unit may comprise a locking hole provided in one of the link and the input unit body, and a locker provided to slide in the other and having a hook to be locked to the locking hole.

Additional aspects and/or advantages of the invention will be set forth in part in the description which follows and, in part, will be apparent from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompany drawings of which:

FIG. 7 is a rear perspective view of a portable computer according to an embodiment of the present invention, in which the tablet body is detached from the hinge assembly;

DETAILED DESCRIPTION OF THE PREFERRED EMBODIMENTS

Figure 1:
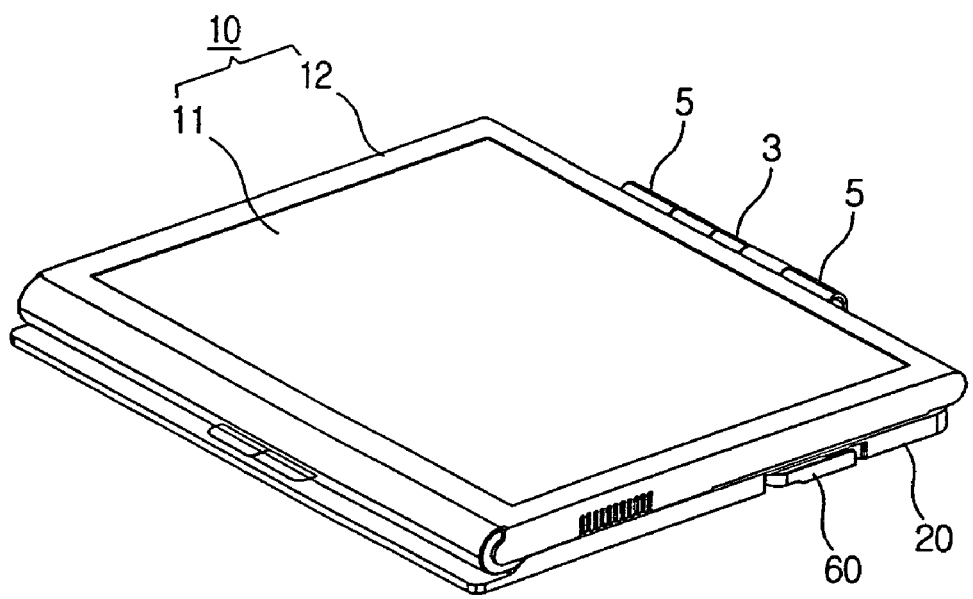
FIG. 1 is a perspective view of a portable computer according to an embodiment of the present invention in a tablet operation position.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
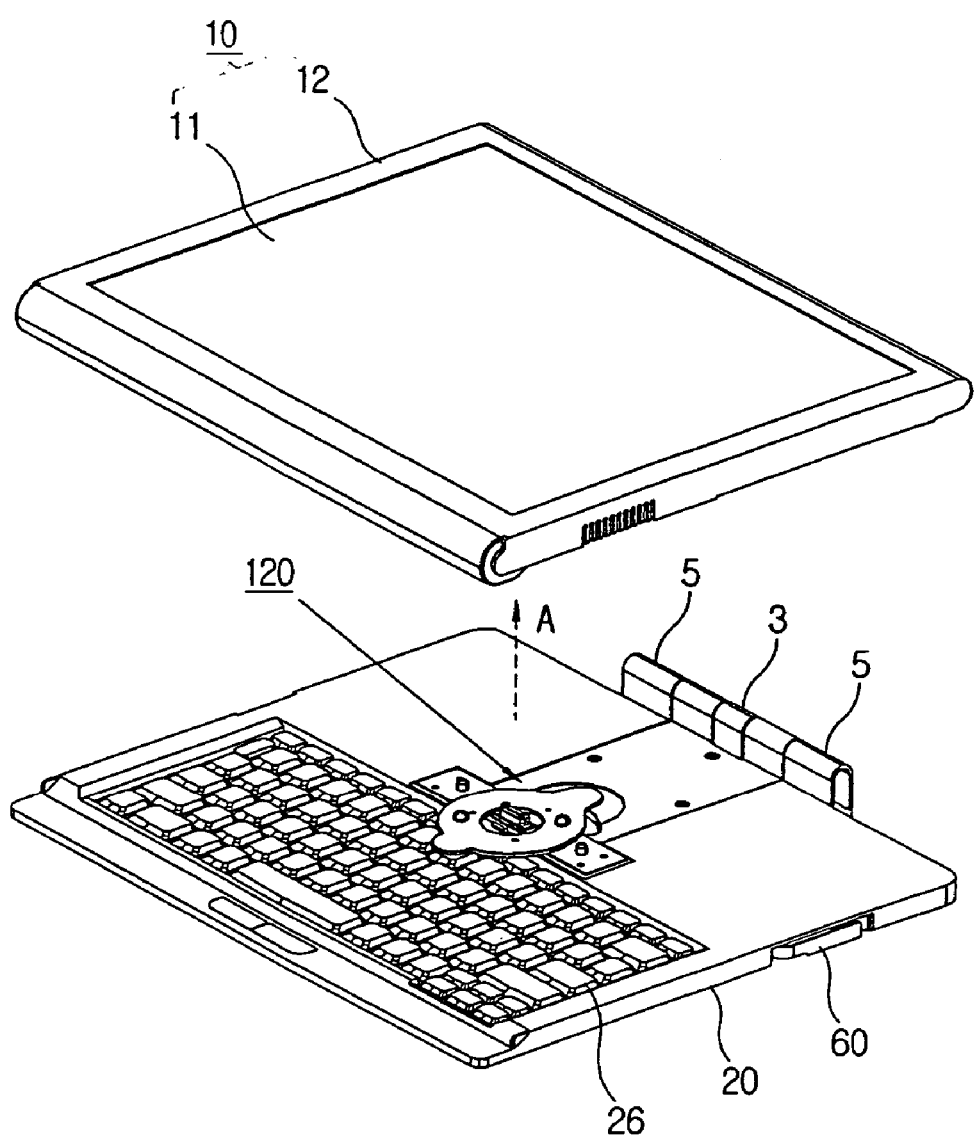
FIG. 2 is a perspective view of the portable computer of FIG. 1 in a detached position.

As shown in FIGS. 1 and 2, a portable computer according to an embodiment of the present invention comprises a tablet body 10 including a plurality of hardware components and capable of a tablet operation; an input unit body 20 detachably connected to the table body 10 and allowing the tablet body 10 to be detached therefrom in a direction of "A" in FIG. 2; and a hinge assembly 120 provided between the table main body 10 and the input unit body 20.

The tablet main body 10 comprises an external casing 12 forming an outer appearance; a plurality of hardware components (not shown) accommodated in the external casing 12 and including a main board, a central processing unit (CPU), a random access memory (RAM), etc.; and a display part 11 supported by the external casing 12 and displaying a picture.

Figure 3:
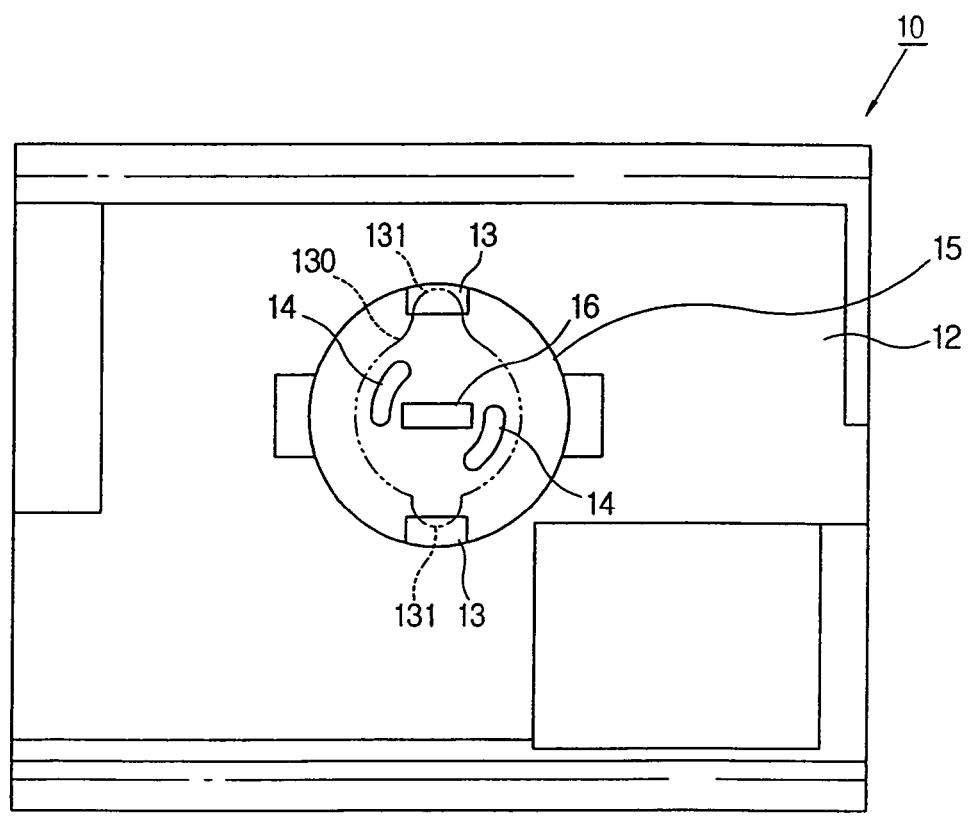
FIG. 3 is a schematic rear view illustrating a rotation plate coupled to a rear of a tablet body according to an embodiment of the present invention.

As shown in FIG. 3, in the rear of the external casing 12 are provided a recessed portion 15 recessed from the surface thereof; a pair of projections 13 protruding from the surface of the recessed portion 15; a pair of guide grooves 14 recessed from the surface of the recessed portion 15; and a connection portion 16 provided between the pair of guide grooves 14.

The projection 13 allows a rotation projection 131 of a rotation plate 130 to be locked thereto and released therefrom. Thus, as shown in FIG. 3, while the rotation projection 131 is locked to the projection 13, the tablet body 10 is kept coupled to the input unit body 20 without being separated from the input unit body 20.

Figure 4:
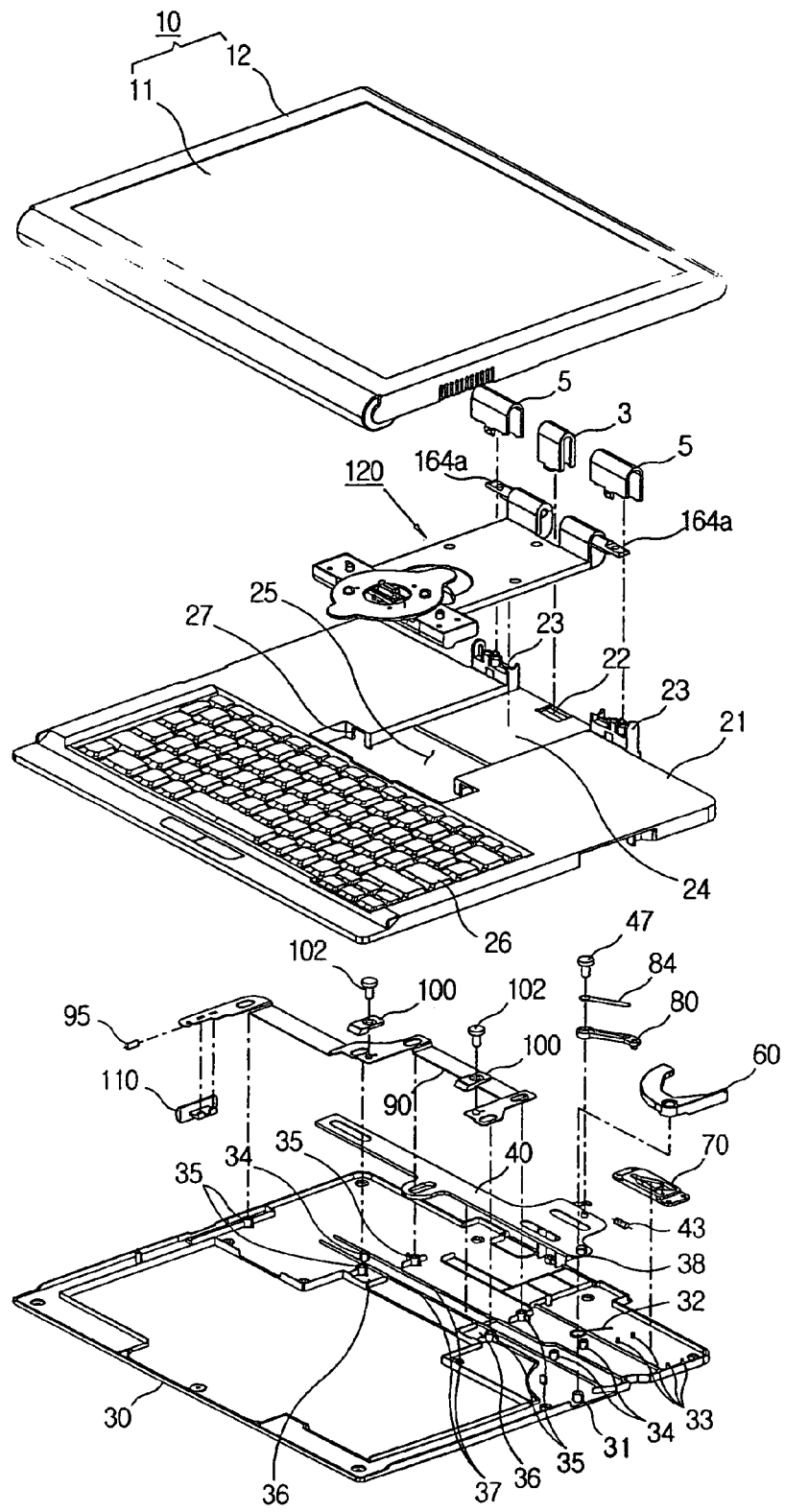
FIG. 4 is an exploded perspective view of a portable computer according to an embodiment of the present invention.

As shown in FIG. 4, the input unit body 20 comprises a upper casing 21 forming an outer appearance, and a lower casing 30 coupled to a lower portion of the upper casing 21.

The upper casing 21 is provided with a keyboard 26 for an input operation; a link accommodating portion 24 recessed from an upper surface thereof; a through portion 25 penetratingly formed on the upper surface, and a hook inserting portion 27 communicating with the through hole 25 and through which a hook 100 (to be described later) is inserted. Further, the upper casing 21 is coupled with a pair of hinge shaft caps 5 placed in a back of the link accommodating portion 24; and a cable cap 3 placed between the pair of hinge shaft caps 5.

Further, the upper casing 21 comprises a pair of coupling portions 23 to which the pair of hinge shift caps 5 is coupled; and a fitting groove 22 into which the cable cap 3 is fitted. The hinge shaft cap 5 and the coupling portion 23 are coupled to interpose a first main hinge shaft 164a therebetween, so that the first main hinge shaft 164a is supported by the hinge shaft cap 5 and the coupling portion 23. The cable cap 3 fitted into the fitting groove 22 is supported by a cable cap supporter 38 formed in the lower casing 30.

Figure 5:
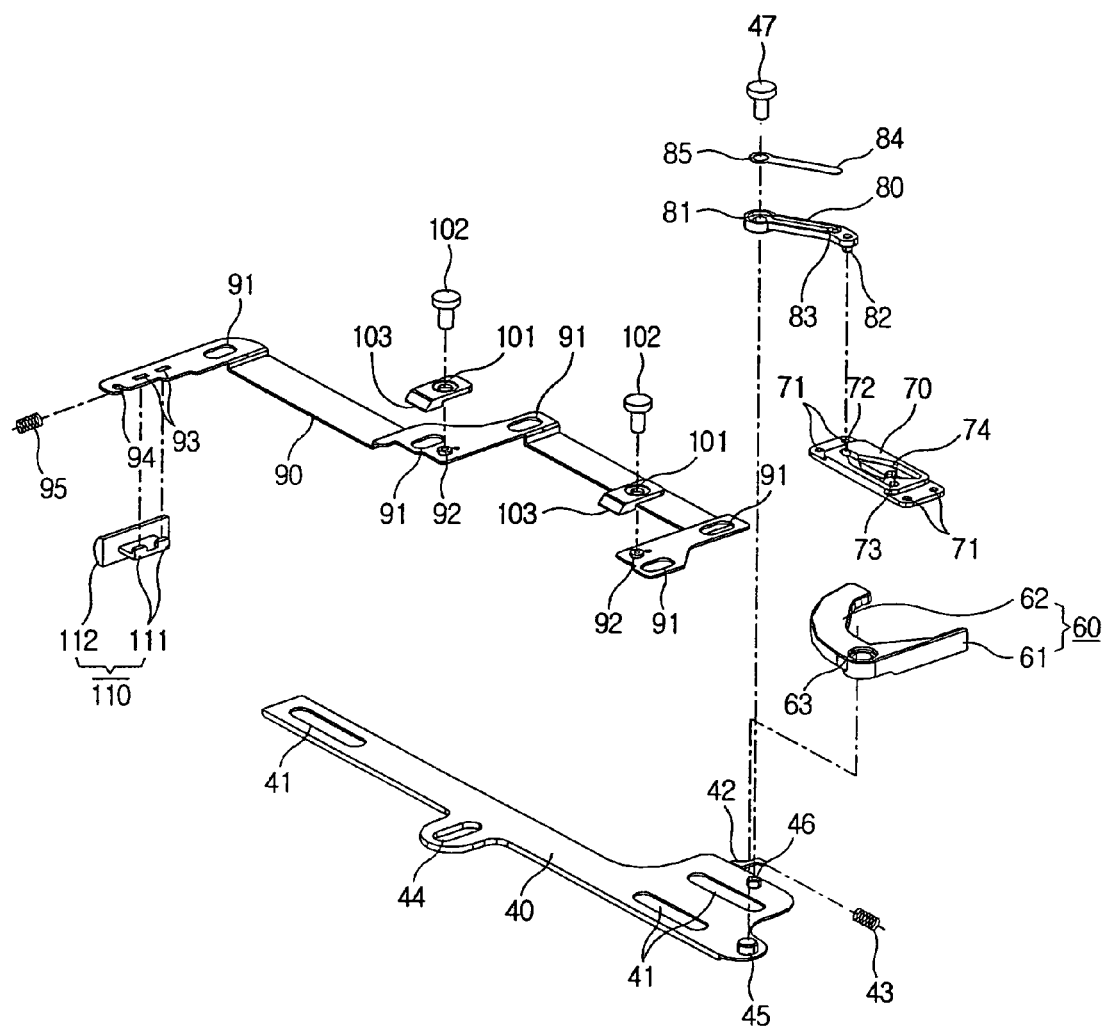
FIG. 5 is an enlarged view of the latch, the lever, the guide, the stopper assembly, the locker, the hook, and the handling knob shown in FIG. 4.

As shown in FIGS. 4 and 5, between the upper casing 21 and the lower casing 30 are provided a coupling unit detachably coupling the tablet body 10 with the input unit body 20; and a locking unit allowing a link 126 (FIG. 7) of the hinge assembly 120 to be locked to and released from the input unit body 20.

The coupling unit comprises the projection 13 formed in the tablet body 10; the rotation projection 131 formed in the rotation plate 130 and being locked to the projection 13; a latch 40 provided in the lower casing 30 and straightly sliding to rotate the rotation plate 130; and a lever 60 making the latch 40 slide in the lower casing 30. Further, the lever 60 is coupled with a fourth spring 32 elastically returning the lever 60 to its original position.

As shown in FIG. 4, the latch 40 is provided in the lower casing 30 and sliding in a straight direction. Here, the latch 40 is engaged with a guide 70 guiding both the rotation plate 130 and the latch 40 to slide in the straight direction, and the lever 60 making the latch 40 slide. Additionally, between the latch 40 and the guide 70 is provided a stopper assembly 80, 84.

The latch 40 is placed on a pair of latch guide ribs 37 formed in the lower casing 30, and connected to the lower casing 30 by a first spring 43 exerting an elastic force in an opposite direction to the sliding operation of the latch 40.

As shown in FIG. 5, the latch 40 comprises a guide elongated hole 41 penetratingly formed thereon; a spring holder 42 holding the first spring 43; a lever projection 45 coupled with the lever 60; a stopper coupling portion 46 to which the stopper assembly 80, 84 is coupled; and a rotation guiding elongated hole 44 coupled with the rotation plate 130.

In the guide elongated hole 41 is inserted a latch boss 34 protruding from the lower casing 30 (refer to FIG. 4). Further, to the spring holder 42 is coupled a second end of the first spring 43 having a first end fastened to the lower casing 30.

The stopper coupling portion 46 is coupled with a second screw 47, thereby fastening the stopper assembly 80, 84 to the latch 40.

The guide 70 is connected to the latch 40 through the stopper assembly 80, 84, thereby guiding the latch 40 to slide in the straight direction.

As shown in FIG. 5, the guide 70 is formed with a guide boss hole 71 coupled with a guide boss 33 formed on the lower casing 30; and first through third sections 72, 73 and 74 accommodating a stopper projection 82 of the stopper assembly 80, 84 (to be described later) in correspondence to the sliding operation of the latch 40.

Further, as shown in FIG. 5, the stopper assembly 80, 84 comprises a stopper 80 connecting the latch 40 and the guide 70; and a third spring 84 coupled to the stopper 80.

The stopper 80 is formed with a stopper through hole 81 allowing the second screw 47 to be passed therethrough and coupled to the stopper coupling portion 46 of the latch 40, and the stopper projection 82 moving along the first through third sections 72, 73 and 74 of the guide 70 in correspondence with the sliding operation of the latch 40.

The third spring 84 is placed on the stopper 80 and elastically presses the stopper 80 downward. The third spring 84 has a first end formed with a third spring hole 85 and coupled onto the stopper 80 by the second screw 47 passing through the third spring hole 85, and a second end placed on a protrusion 83 of the stopper 80.

As shown in FIG. 5, the lever 60 comprises a grip 61 allowing a user to push the lever 60; and a lever guide 62 extending from the grip 61 and stopped by a lever projection 45 of the latch 40; and a lever coupling hole 63 formed between the grip 61 and the lever guide 62.

The grip 61 is exposed to the outside of the lower casing 30, and the lever guide 62 is stopped by the lever projection 45 of the latch 40 and interlocks the lever 60 with the latch 40.

Thus, the lever boss 31 formed on the lower casing 30 is rotatably inserted in the lever coupling hole 63, so that the lever 60 is rotatably supported against the lower casing 30 by both the lever coupling hole 63 and the lever boss 31 inserted in the lever coupling hole 63.

The locking unit comprises a locking hole 174 formed in a holder 170 (to be described later); a locker 90 provided above the latch 40 and having a hook 100 to be locked to the locking hole 174; and a knob 110 controlling the locker 90 to move.

The locker 90 is spaced from and disposed above the latch 40 in the lower casing 30, thereby sliding transversely to the sliding direction of the latch 40.

The locker 90 has a first end connected to the lower casing 30 by a second spring 95, wherein the second spring 95 exerts an elastic force in an opposite direction to the sliding direction of the locker 90.

As shown in FIG. 5, the locker 90 comprises a plurality of locker guide elongated holes 91 in which a plurality of locker bosses 35 of the lower casing 30 is inserted, the hook 100 to be locked to the locking hole 174; a knob coupling hole 93 coupled with the knob 110; and a second spring holder 94 to which a second end of the second spring 95 having a first end coupled to the lower casing 30 is coupled.

Referring to FIGS. 4 and 5, the hook 100 is coupled to the locker 90 by a third screw 102, and comprises a hooking portion 103 to be locked to and released from the locking portion 174 of the holder 170 (to be described later) according to the sliding operation of the locker 90; and a third screw through hole 101 penetratingly formed thereon. Thus, the third screw 102 passes through the third screw through hole 101 and then is coupled to the hook coupling hole 92 formed on the locker 90.

As shown in FIG. 5, the knob 110 comprises a knob coupling projection 111 inserted in the knob coupling hole 93 of the locker 90, and a knob portion 112 exposed to the outside of the lower casing 30 and allowing a user to push the knob 110.

Figure 6:
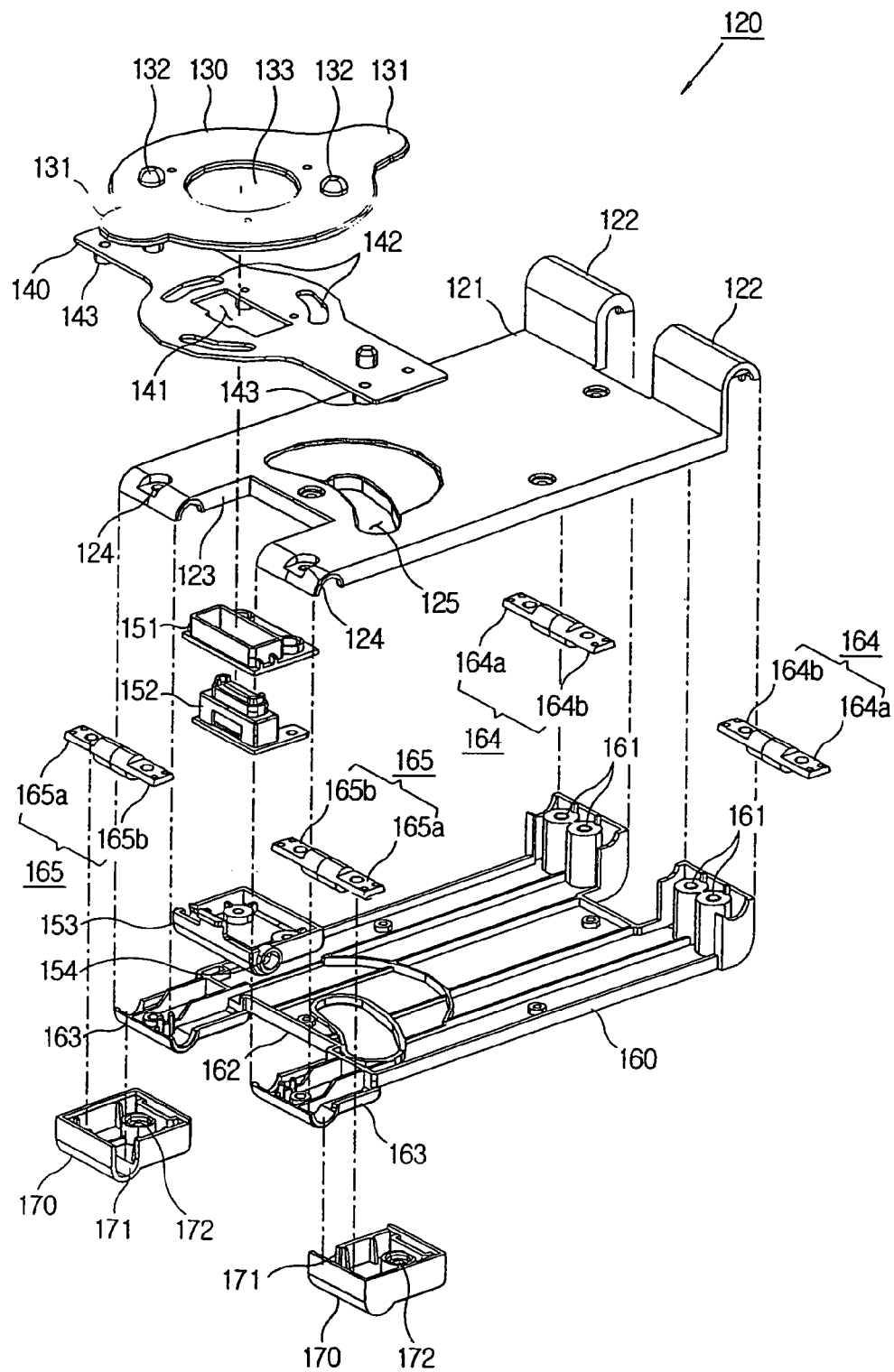
FIG. 6 is an exploded perspective view of the hinge assembly of FIG. 4.

As shown in FIG. 6, the hinge assembly 120 comprises the link connecting the tablet body 10 with the input unit body 20; a first hinge rotatably connecting the link 126 with the input unit body 20; a second hinge rotatably connecting the link 126 with the tablet body 10 at a position spaced from the first hinge; a supporting unit rotatably coupled to a coupling portion between the second hinge and the link 126; the rotation plate 130 rotatably coupled to the supporting unit; and a connector assembly 150 coupled to the supporting unit.

The link 126 has a first end connected to the input unit body 20 by the first hinge, and a second end connected to the supporting unit by the second hinge.

As shown in FIG. 6, the link 126 comprises an upper cover 121 and a lower cover 160. The upper cover 121 comprises a pair of bent portions 122 upwardly extending from a surface thereof, a projection guide elongated hole 125 penetratingly formed on the surface, and a upper connector installation portion 123 formed by cutting off the surface opposite to the bent portions 122 and supporting an upper portion of the connector assembly 150.

The upper cover 121 is formed with upper cover coupling holes 124 to be coupled with the lower cover 160 at opposite sides of the upper connector installation portion 123.

The lower cover 160 comprises a lower cover boss 161 formed corresponding to the bent portion 122 of the upper cover 121, a lower connector installation portion 122 formed corresponding to the upper connector installation portion 123, and extending portions 163 disposed at opposite sides with respect to the lower connector installation portion 162.

The supporting unit comprises a supporting plate 140 interposed between the link 126 and the rotation plate 130, and the pair of holders 170 respectively coupled to opposite end portions of the supporting plate 140.

The supporting plate 140 is formed with a connector insertion hole 141 penetrating the center thereof, a plurality of rotation guide holes 142 adjacent to the connector insertion hole 141, and a holder coupling boss 143 to be coupled with the pair of holders 170 at opposite ends thereof.

The holder 170 forms a pair, and coupled to the opposite ends of the supporting plate 140, thereby allowing the link 126 to be interposed between the pair of holders 170.

Each holder 170 comprises a first screw through hole 172 into which a first screw 173 is inserted to be coupled with the holder coupling boss 143, and an opening 171 supporting a second main hinge shaft 165a of a second hinge shaft 165 (to be described later).

The rotation plate 130 is rotatably coupled to the supporting unit, and comprises a center hole 133; the pair of rotation projections 131 extended outwardly; a pair of rotation protrusions 132 protruding from an upper surface thereof; and a plurality of rotation protrusions (not shown) protruding from a lower surface thereof. Here, the rotation protrusions (not shown) are accommodated in the rotation guide hole 142 of the supporting plate 140.

The connector assembly 150 is inserted in the through portion 133 of the rotation plate 130 through the connector insertion hole 141 of the supporting plate 140. Further, the connector assembly 150 comprises a docking connector 152 connected to the connection portion 16 formed in the rear of the tablet body 10; and a connector upper and lower covers 151 and 153 supporting the docking connector 152.

The connector lower cover 153 is formed with fitting projections 154 protruding at opposite ends thereof, and each fitting projection 154 is rotatably supported by each extending portion 163.

The first hinge comprises a first hinge shaft 164 comprising the first main hinge shaft 164a and a first link hinge shaft 164b, which are rotatably coupled to each other; the bent portion 122 and the lower cover boss 161 coupled to each other and functioning as a first link shaft supporter to support the first link hinge shaft 164b; and the hinge shaft cap 5 and the coupling portion 23 coupled to each other and functioning as a first main shaft supporter to support the first main hinge shaft 164a.

In more detail, the left one of the pair of first hinge shafts 164 will be described by way of example with reference to FIG. 6. The first right hinge shaft 164b is supported between the bent portion 122 and the lower cover boss 161, and the first left hinge shaft 164a is supported between the hinge shaft cap 5 and the coupling portion 23.

The second hinge comprises a second hinge shaft 165 comprising the second main hinge shaft 165a and a second link hinge shaft 165b, which are rotatably coupled to each other; a front portion of the upper cover 121 and the extending portion 163 of the lower cover 160 coupled to each other and functioning as a second link shaft supporter to support the second link hinge shaft 165b; and the opposite end portions of the supporting plate 140 and the pair of holders 170 coupled to each other and functioning as a second main shaft supporter to support the second main hinge shaft 165a.

In more detail, the left one of the pair of second hinge shafts 165 will be described by way of example with reference to FIG. 6. The second link hinge shaft 165b is supported between the front portion of the upper cover 121 and the extending portion 163 of the lower cover 160, and the second main hinge shaft 165a is supported between the end portion of the supporting plate 140 and the holder 170. At this time, the second main hinge shaft 165a is inserted in the opening 171 of the holder 170.

Figure 7:
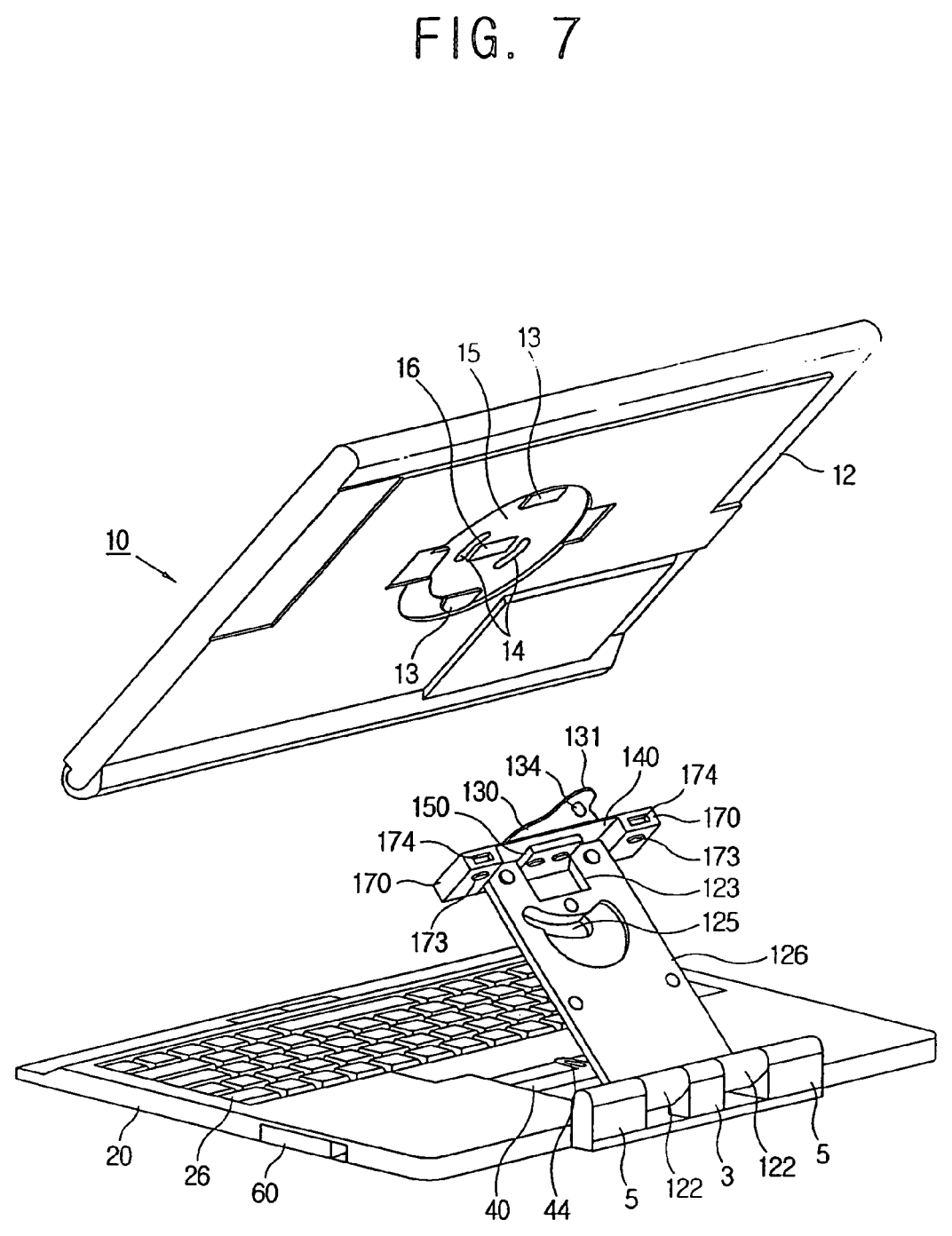

In FIG. 7, the first end of the link 126 of the hinge assembly 120 with this configuration is rotatably coupled to the input unit body 20, and the rotation projection 131 of the rotation plate 131 provided in the second end of the link 126 thereof is released from the projection 13 of the tablet body 10, so that the tablet body 10 is separated from the second end of the link 126.

Referring to FIG. 7, the rotation plate 130 is coupled to the upper surface of the supporting plate 140, and the pair of holders 170 and the connector assembly 150 are coupled to the lower surface of the supporting plate 140.

Here, the rotation projection 131 of the rotation plate 130 is formed with a rotation guide projection 134 protruding downward. Here, the rotation guide projection 134 can be inserted in the rotation guide elongated hole 44 of the latch 40 provided in the input unit body 20 through the projection guide elongated hole 125 formed on the link 126.

Further, each holder 170 is formed with the locking hole 174 to which the hooking portion 103 of the hook 100 is locked. The connector assembly 150 is connectable to the connection portion 16 provided on the rear of the tablet body 10, thereby electrically connecting the input unit body 20 with the tablet body 10.

Further, the rotation protrusion 132 of FIG. 6 formed on the upper surface of the rotation plate 130 is accommodated in the guide groove 14 formed on the tablet body 10 and disposed at the opposite sides of the connection portion 16, so that the rotation protrusion 132 can slide along the guide groove 14.

With this configuration, the portable computer according to an embodiment of the present invention can be changed from a tablet operation position (refer to FIG. 1) in which the tablet body 10 is put on the input unit body 20 to expose the display part 11 upward to a separation position (refer to FIG. 2) in which the tablet body 10 is separated from the input unit body 20 to do the tablet operation while the tablet body 10 is carried.

Further, the portable computer according to an embodiment of the present invention can be changed from the tablet operation position (refer to FIG. 1) in which the tablet body 10 is put on the input unit body 20 to expose the display part 11 upward to a general operation position (Refer to FIG. 12) in which the tablet body 10 is tilted against the input unit body 20 and the keyboard 26 of the input unit body 20 is exposed to the outside to allowing a user to perform an input operation.

When the portable computer is changed from the tablet operation position (refer to FIG. 1) in which the tablet body 10 is put on the input unit body 20 to expose the display part 11 upward to the general operation position (refer to FIG. 12), the portable computer operates as follows.

As shown in FIG. 1, in the case of the tablet operation position, the rotation projection 131 of the rotation plate 130 is locked to the projection 13 of the table body 10, so that the tablet body 10 is locked to the input unit body 20 (refer to FIG. 3). At the same time, the hooking portion 103 of the hook 100 coupled to the locker 90 is locked to the locking hole 174 formed in the holder 170 of the supporting unit, so that the link 126 is locked to the input unit body 20 (refer to FIG. 8).

Figure 8:
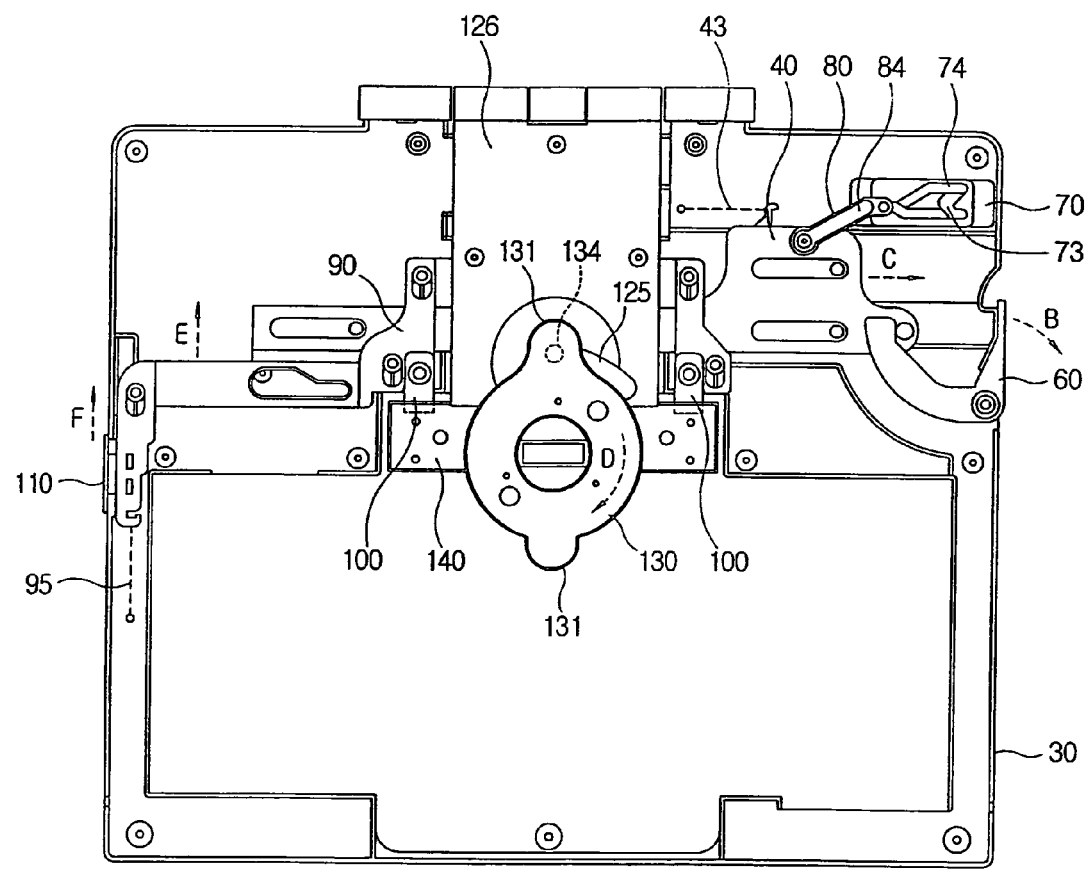
FIGS. 8 and 9 illustrate an operation between a locking unit and a coupling unit, according to an embodiment of the present invention.

Further, as shown in FIG. 8, the rotation guide projection 134 of the rotation plate 130 is inserted in the rotation guide elongated hole 44 of the latch 40 through the projection guide elongated hole 125 of the link 126, and the stopper projection 82 of the stopper 80 is accommodated in the first section 72 of the guide 70.

In this position, a user can release the tablet body 10 from the input unit body 20 by pushing the knob 110 in a direction of "F". That is, the link 126 and the tablet body 10 can be spaced from the input unit body 20.

At this time, when the knob 110 is pushed in the direction of "F", the locker 90 slides in a direction of "E" and at the same time the hook 100 coupled to the locker 90 also slides in the direction of "E".

Figure 9:
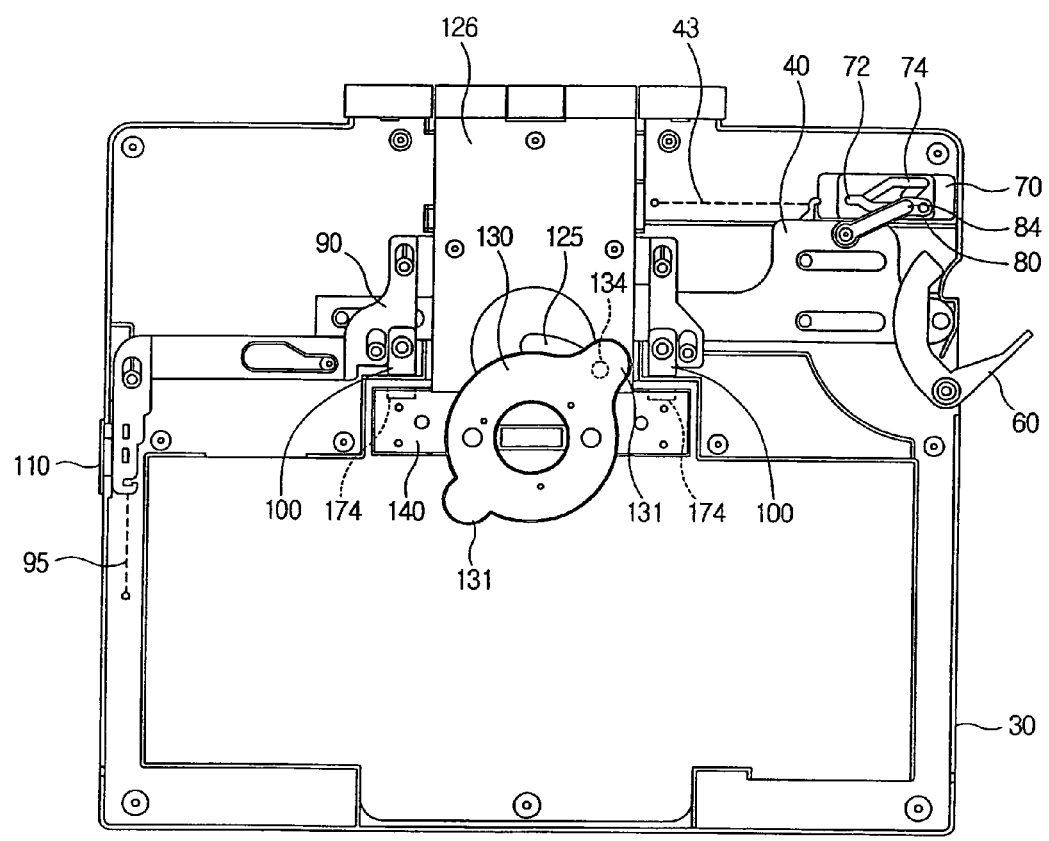

Then, as shown in FIG. 9, the hooking portion 103 of the hook 100 is released from the locking hole 174 of the holder 170 coupled to the supporting plate 140. That is, the link 126 coupled with the tablet body 10 is released from the input unit body 20.

Figure 10:
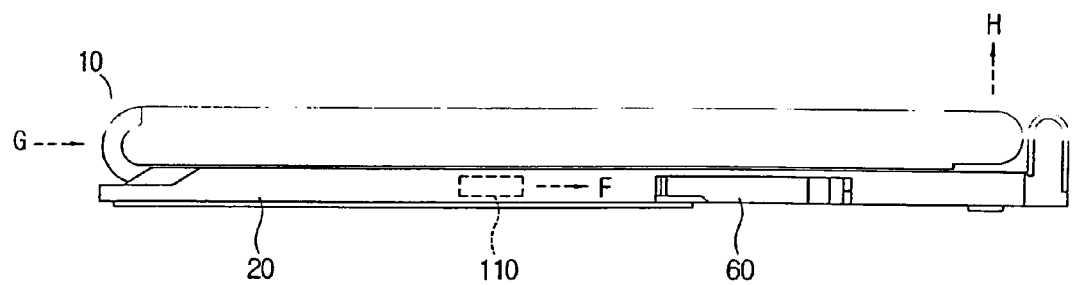
FIGS. 10 through 13 illustrate rotated states of a tablet body, according to an embodiment of the present invention.
Figure 11:
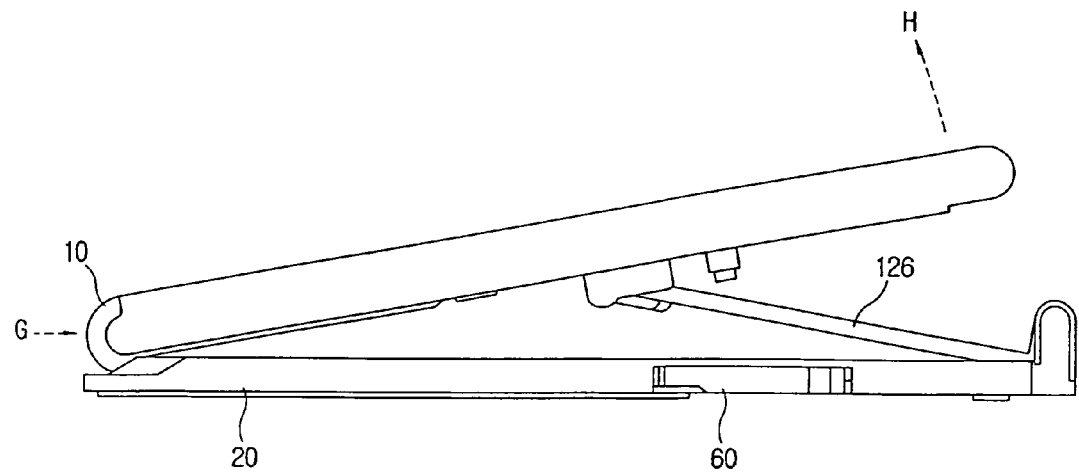
Figure 12:
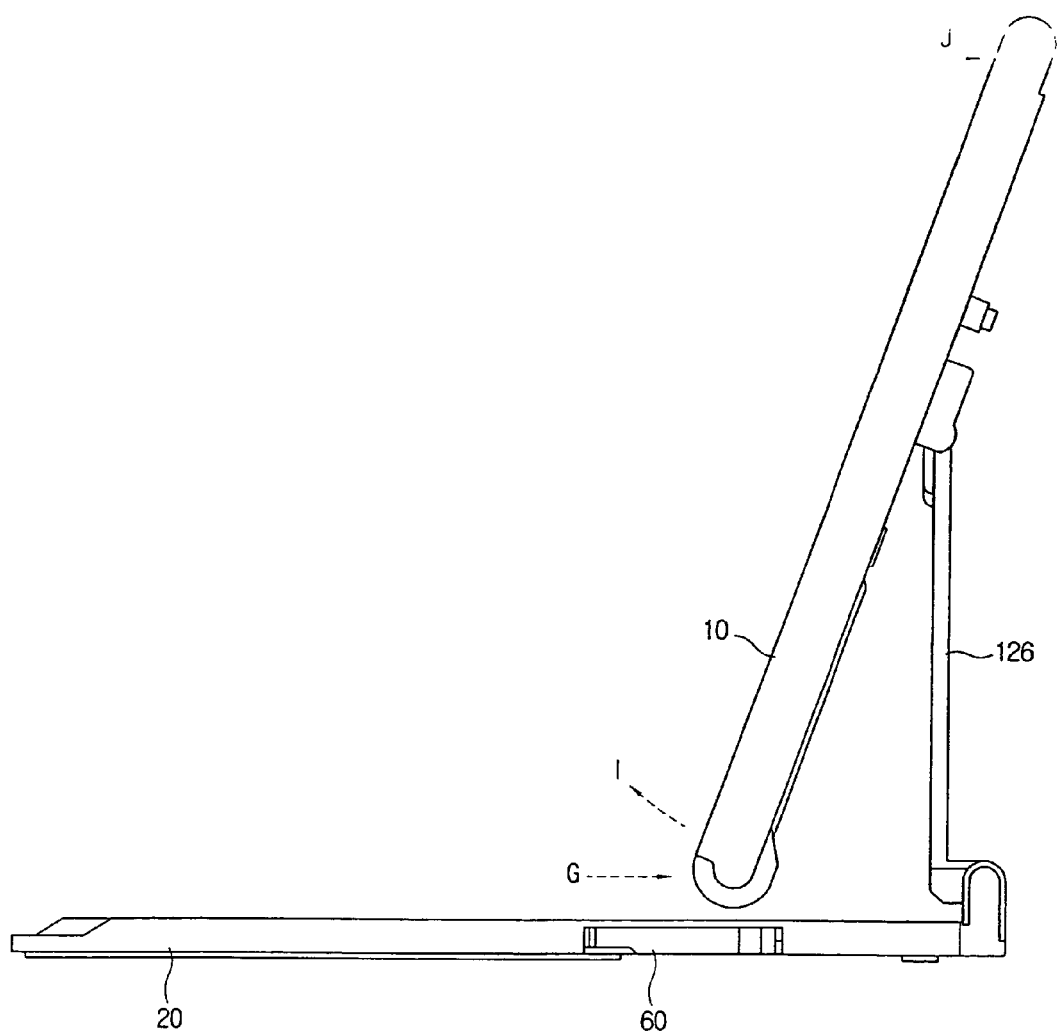

Thus, the tablet body 10 can be tilted as shown in FIGS. 10 through 11 in the state that the link 126 coupled with the tablet body 10 is released from the input unit body 20, so that the portable computer is in the general operation position of FIG. 12, in which the keyboard 26 of the input unit body 20 under the tablet body 10 is exposed to the outside.

That is, as shown in FIGS. 10 and 11, when a front of the tablet body 10 is pushed in a direction of "G" and a back of the tablet body 10 is lifted up in a direction of "H", the table body 10 is tilted against the input unit body 20. At this time, the display part 11 faces a user and the keyboard 26 of the input unit body 20 is exposed to the outside, so that a user can operate the keyboard 26 and look at the display part 11 of the tablet body 10.

On the other hand, when the portable computer is changed from the general operation position (refer to FIG. 12) that the table body 10 is tilted against the input unit body 20 and the keyboard 26 of the input unit body 20 is exposed to the outside so as to allow a user to do the input operation through the keyboard 26 to the tablet operation position (refer to FIG. 1) that the tablet body 10 is put on the input unit body 20 to expose the display part 11 upward, the portable computer operates as follows.

Figure 13:
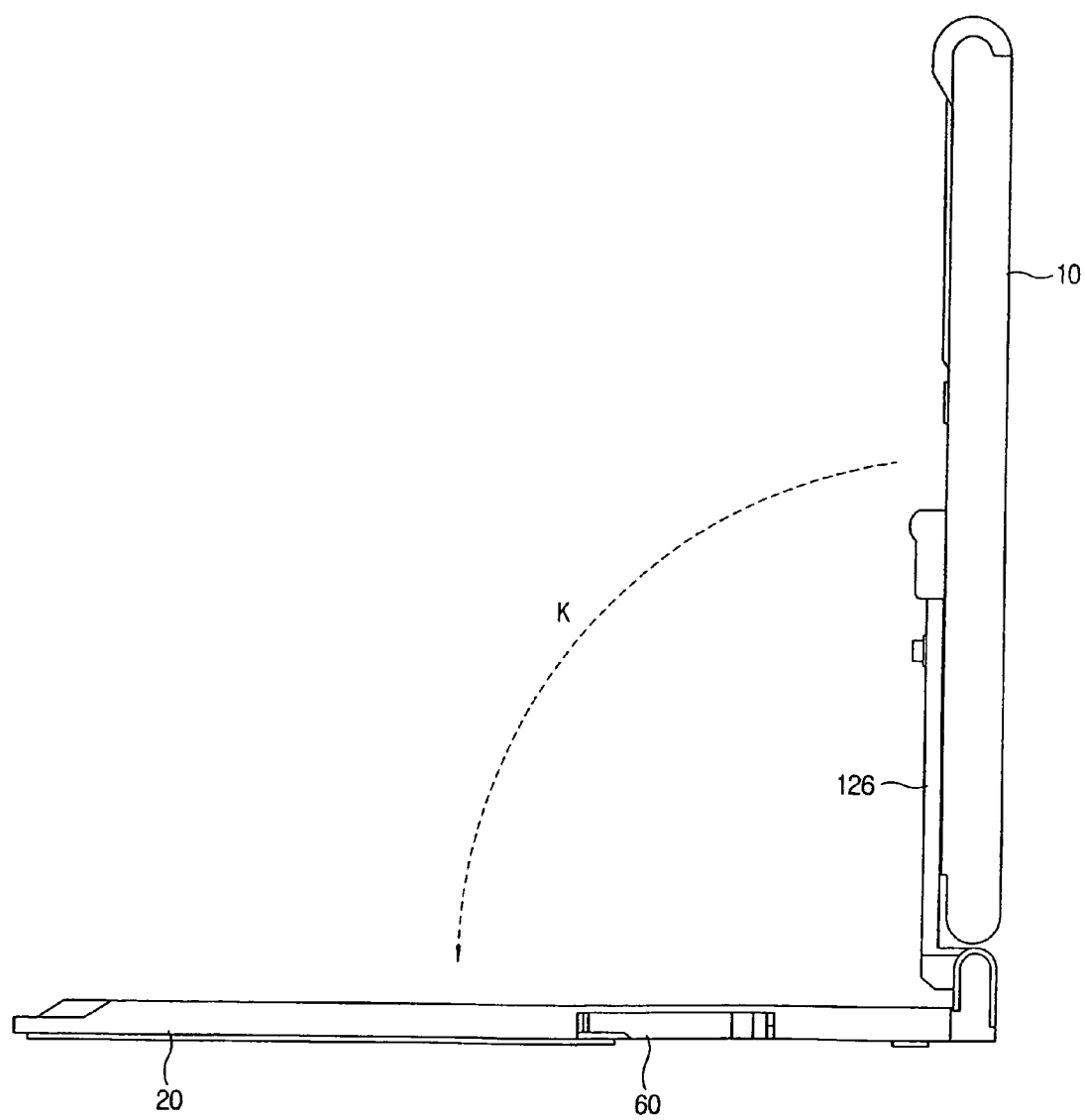

As shown in FIG. 12, the front of the tablet body 10 is pushes in a direction of "I" and the back of the tablet body 10 is pushed in a direction of "J". Then, as shown in FIG. 13, a user faces the link unit 126 coupled to the rear of the tablet body 10. In this state, the tablet body 10 is rotated in a direction of "K", so that the tablet body 10 is put on the input unit body 20 to expose the display part 11 upward as shown in FIGS. 1, 8 and 10, thereby making the tablet operation possible.

On the other hand, when the portable computer is changed from the tablet operation position (refer to FIG. 1) in which the tablet body 10 is put on the input unit body 20 to expose the display part 11 upward to the separation position (refer to FIG. 2) that the tablet body 10 is separated from the input unit body 20 to do the tablet operation while the tablet body 10 is carried.

As shown in FIG. 1, in the case of the tablet operation position, the rotation projection 131 of the rotation plate 130 is locked to the projection 13 of the table body 10, so that the tablet body 10 is locked to the input unit body 20 (refer to FIG. 3). At the same time, the hooking portion 103 of the hook 100 coupled to the locker 90 is locked to the locking hole 174 formed in the holder 170 of the supporting unit, so that the link 126 is locked to the input unit body 20 (refer to FIG. 8).

Further, as shown in FIG. 8, the rotation guide projection 134 of the rotation plate 130 is inserted in the rotation guide elongated hole 44 of the latch 40 through the projection guide elongated hole 125 of the link 126, and the stopper projection 82 of the stopper 80 is accommodated in the first section 72 of the guide 70.

In this position, the lever 60 is rotated in the direction of "B", so that the latch 40 slides in a direction of "C", thereby rotating the rotation plate 130 in a direction of "D".

When the rotation plate 130 is rotated in the direction of "D", the stopper projection 82 of the stopper 80 moves from the first section 72 to the second section 73 of the guide 70 as shown in FIG. 9, and the rotation projection 131 of the rotation plate 130 is released from the projection 13 of the tablet body 10. That is, the tablet body 10 can be separated from the input unit body 20.

Then, as shown in FIG. 2, the tablet body 10 is released and separated from the input unit body 20 in the direction of "A", so that the tablet body 10 is in the separation position. At this time, the link 126 is accommodated in the link accommodating portion 24 of the input unit body 20.

Thus, a user can perform the tablet operation while carrying the tablet body 10 separated from the input unit body 20.

On the other hand, in the state that the rotation plate 130 is rotated by the lever 60 in the direction of "D" and the stopper projection 82 is accommodated in the second section 73 of the guide 70, when a user rotates the lever 60 once more, the stopper projection 82 is returned by the elastic force of the first spring 43 from the second section 73 of the guide 70 to the first section 72 via the third section 74. Then, the lever 60 and the rotation plate 130 are elastically returned to there initial position as shown in FIG. 2.

Thus, the portable computer according to an embodiment of the present invention can alternate among the tablet operation position of FIG. 1, the separation position of FIG. 2 capable of the tablet operation, and the general operation position of FIG. 12, so that it is convenient for a user to operate. Further, the link 126 is not externally exposed in the tablet operation position of FIG. 1, so that the portable computer can have a slim and beautiful outer appearance.

As described above, the present invention provides a portable computer, in which a tablet body is easily alternated between a tablet operation position and an exposed position, thereby providing user convenience.

Further, the present invention provides a portable computer, in which a link is interposed between a tablet body and an input unit body at a tablet operation position and is not externally exposed, thereby providing an attractive and slim outer appearance.

Thus, the tablet body 10 can be tilted as shown in FIGS. 10 through 11 in the state that the link 126 coupled with the tablet body 10 is released from the input unit body 20, so that the portable computer is in the general operation position of FIG. 12, in which the keyboard 26 of the input unit body 20 under the tablet body 10 is externally exposed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A portable computer comprising:
   a tablet body to accommodate a plurality of hardware components and that is capable of a tablet operation;
   an input unit body to input data into the tablet body; and
   one link having a first end rotatably coupled to a rear of the tablet body and a second end tiltably coupled to a back of the input unit body, wherein
   the tablet body alternates between a tablet operation position in which the tablet body is folded on the input unit body while the link is interposed between the rear of the tablet body and an upper surface of the input unit body, and an exposed position in which the tablet body coupled with the link is spaced from the input unit body and the upper surface of the input unit body is externally exposed to input data, wherein the tablet body is movable from the tablet operation position to the exposed position if a front of the tablet body is pushed toward the second end of the one link and a back of the tablet body is lifted up with respect to the input unit body.

2. The portable computer according to claim 1, wherein the tablet body is detachably coupled to the input unit body.

3. The portable computer according to claim 2, further comprising a coupling unit provided in a coupling portion between the link and the tablet main body and detachably coupling the tablet body to the input unit body, wherein the coupling unit comprises a projection provided in one of the tablet body and the link, and a rotation plate rotatably provided in the other one and formed with a rotation projection to be locked to the projection.

4. The portable computer according to claim 3, further comprising a latch provided to slide in the input unit body, interlocking with the rotation plate, and rotating the rotation plate to cause the rotation projection to be locked to and released from the projection.

5. The portable computer according to claim 4, wherein the rotation plate is formed with a rotation guide projection, the link is formed with a projection guide elongated hole in which the rotation guide projection is inserted, and the latch is formed with a rotation guide elongated hole in which the rotation guide projection inserted in the projection guide elongated hole in the tablet operation position is guided.

6. The portable computer according to claim 5, further comprising a lever rotatably provided in the input unit body, connected to the latch, and allowing the latch to slide in the input unit body.

7. The portable computer according to claim 6, wherein the latch is formed with a lever projection, and the lever comprises a grip exposed to the outside of the input unit body, and a lever guide extending from the grip and stopped by the lever projection in the input unit body.

8. The portable computer according to claim 7, further comprising:

a guide provided in the input unit body and guiding the latch to slide; and a stopper assembly connecting the guide with the latch.

9. The portable computer according to claim 8, further comprising a first spring including a first end coupled to the input unit body and a second end coupled to the latch, and exerting an elastic force to the latch.

10. The portable computer according to claim 1, further comprising a locking unit provided between the link and the input unit body and allowing the link to be locked to and released from the input unit body.

11. The portable computer according to claim 10, wherein the locking unit comprises a locking hole provided in one of the link and the input unit body, and a locker provided to slide in the other and including a hook to be locked to the locking hole.

12. The portable computer according to claim 11, further comprising a knob provided to slide in the input unit body, connected to the locker, and making the locker to slide.

13. The portable computer according to claim 12, further comprising:

a first hinge rotatably connecting the link and the input unit body; and a second hinge rotatably connecting the link and the tablet body at a position spaced from the first hinge.

14. The portable computer according to claim 13, further comprising a supporting unit rotatably coupled to the link by the second hinge, wherein the supporting unit is formed with the locking hole to which the hook is locked in the tablet operation position.

15. The portable computer according to claim 14, wherein the first hinge comprises:

a pair of first hinge shafts;

a first link shaft supporter provided in the link and supporting a first side of each first hinge shaft; and a first main shaft supporter provided in the input unit body and supporting a second side of each first hinge shaft, each first hinge shaft comprising a first main hinge shaft and a first link hinge shaft, which are rotatably coupled to each other.

16. The portable computer according to claim 14, wherein the second hinge comprises:

a pair of second hinge shafts;

a second link shaft supporter provided in the link and supporting a first side of each second hinge shaft; and a second main shaft supporter provided in the supporting unit and supporting a second side of each second hinge shaft, each second hinge shaft comprising a second main hinge shaft and a second link hinge shaft, which are rotatably coupled to each other.

17. The portable computer according to claim 16, wherein the input unit body comprises a link accommodating portion to accommodate the link at the tablet operation position.

18. The portable computer according to claim 17, wherein the link comprises a connector assembly electrically connecting the tablet body with the input unit body.

19. The portable computer according to claim 18, further comprising a second spring including a first end coupled to the input unit body and a second end coupled to the locker, and exerting an elastic force to the locker.

20. The portable computer according to claim 9, further comprising a locking unit provided between the link and the input unit body and allowing the link to be locked to and released from the input unit body.

21. The portable computer according to claim 20, wherein the locking unit comprises a locking hole provided in one of the link and the input unit body, and a locker provided to slide in the other and having a hook to be locked to the locking hole.

22. A portable computer comprising:

a first portion including a display;

a second portion including an input; and a single link having a first end rotatably coupled to the first portion and a second end tiltably coupling to the second portion, the link allowing a first position in which a back of the first portion is flush against the second portion and the display faces externally, and a second position in which a back of the first portion is at a distance from the second portion to operate the input, wherein the first portion is movable from the first position to the second position if a front of the first portion is pushed toward the second end of the single link and a back of the first portion is lifted up with respect to the second portion.

* * * * *

UNITED STATES PATENT AND TRADEMARK OFFICE
CERTIFICATE OF CORRECTION

PATENT NO. : 7,652,873 B2  Page 1 of 1
APPLICATION NO. : 11/203300
DATED : January 26, 2010
INVENTOR(S) : Seung-woon Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-eighth Day of December, 2010

David J. Kappos
*Director of the United States Patent and Trademark Office*